United States Patent [19]

Ohsaki et al.

[11] Patent Number: 5,658,692
[45] Date of Patent: Aug. 19, 1997

[54] CARBON NEGATIVE ELECTRODE MATERIALS AND LITHIUM SECONDARY CELLS CONTAINING THE SAME

[75] Inventors: Takushi Ohsaki; Ryuichi Yazaki; Hiroshi Taira; Akira Wakaizumi, all of Yamanashi, Japan

[73] Assignee: Nippon Sanso Corporation, Tokyo, Japan

[21] Appl. No.: 514,504

[22] Filed: Aug. 11, 1995

[51] Int. Cl.[6] ................................................. H01M 4/60
[52] U.S. Cl. ................................ 429/218; 423/445 R
[58] Field of Search ............................ 429/218; 423/445

[56] References Cited

U.S. PATENT DOCUMENTS

| | | | |
|---|---|---|---|
| 3,856,574 | 12/1974 | Amagi et al. | 136/120 FC |
| 4,420,415 | 12/1983 | Yuki et al. | 423/445 |
| 5,069,683 | 12/1991 | Fong et al. | 429/218 |
| 5,232,795 | 8/1993 | Simon et al. | 429/218 |
| 5,344,726 | 9/1994 | Tanaka et al. | 429/218 |

OTHER PUBLICATIONS

Rosalind E. Franklin, "Crystallite growth in graphitizing and non-graphitizing carbons", Proc. Roy. Soc. A, vol. 209, pp. 196–218 (no moth available) 1951.

Rosalind E. Franklin, "The Structure of Graphitic Carbon", Acta Cryatal. (1951), 4, 253–26 (no month available) 1951.

*Primary Examiner*—Stephen Kalafut
*Assistant Examiner*—Carol Chaney
*Attorney, Agent, or Firm*—Armstrong, Westerman, Hattori, McLeland, & Naughton

[57] ABSTRACT

Disclosed is a carbon negative electrode material containing microparticles of hard carbon. The pores in the carbon microparticles have an inlet diameter such that an organic solvent in an electrolyte of a lithium secondary cell is substantially impermeable and that lithium ions are permeable. Use of such carbon negative electrode material as a negative electrode enables to provide a lithium secondary cell with excellent cell capacity, in which charge capacity and discharge capacity are improved and irreversible capacity is minimized.

16 Claims, 2 Drawing Sheets

CARBON NEGATIVE ELECTRODE MATERIALS AND LITHIUM SECONDARY CELLS CONTAINING THE SAME

BACKGROUND OF THE INVENTION

1. Field of the Invention

This invention relates to a carbon negative electrode material which is suitably used as a negative electrode of a rechargeable lithium secondary cell and also to a lithium secondary cell containing the same.

2. Description of the Related Art

Lithium primary cells employing lithium metal as negative electrodes are widely employed because of many merits. In the negative electrode of such cell, the lithium metal is oxidized into lithium ions during use (discharge) to be eluted by an organic solvent serving as an electrolyte, and free electrons formed simultaneously are supplied to an external circuit.

If such excellent performance of the lithium primary cell is tried to be utilized as such in a rechargeable secondary cell, the lithium ions are reduced by free electrons supplied from the external circuit contrariwise during discharging on the metal lithium electrode and deposit as metal lithium.

However, when metal lithium deposits on the negative electrode, it deposits in the form of granule or dendrite, inhibiting the negative electrode to resume its original form, causing various troubles including short circuits between the electrodes. Accordingly, the constitution of the lithium primary cell cannot be employed in the secondary cell in which charging and discharging are reversibly repeated.

According to recent studies, it is reported that if a carbon material is used as the negative electrode in place of metal lithium, the carbon material is reversibly doped or undoped with lithium ions, and the resulting cell can be used as a rechargeable secondary cell. Such cells are being put into practical uses. More specifically, the carbon material serving as the negative electrode is doped with lithium ions for charging and undoped for discharging. Accordingly, the amount of lithium ions doped into the carbon material is decisive of the charge capacity at the negative electrode; whereas the amount of undoped lithium ions is decisive of the discharge capacity at the negative electrode.

As the carbon material employable as the negative electrode of the lithium secondary cell, graphite was first focused upon which can be doped with lithium ions in the form of intercalation compound. In this case, one lithium atom per 6 carbon atoms is theoretically the maximum amount of doping at the negative electrode, which also decides the maximum charge capacity.

Accordingly, in order to improve cell capacity of a lithium secondary cell, it is necessary to improve charge capacity of the carbon material used as the negative electrode and also to allow the discharge capacity to approximate to the charge capacity so as to minimize irreversible capacity.

Under such circumstances, it has recently been reported that there can be obtained cell capacity values higher than the theoretical values when graphite is used, if a hard carbon (non-graphitizable carbon) material which is a porous material having a high specific surface area is used as a carbon negative electrode material. The hard carbon material is generally produced by subjecting an organic compound containing carbon as a major component to dry distillation and then heat treatment so as to develop the structure of carbon atom arrangement. Since final characteristics of the hard carbon material is controlled by the latter heat treatment step, the cell capacity (both discharge capacity and charge capacity) is greatly dependent upon the heat treatment temperature.

Meanwhile, it is also reported that, in a relationship between the heat treatment temperature and cell capacity when a hard carbon material prepared by using a furfuryl alcohol resin raw material is used as the negative electrode of a lithium secondary cell, the charge capacity assumes a maximum value at a relatively low heat treatment temperature of 800° C., and the discharge capacity assumes a maximum value at a relatively high heat treatment temperature of 1,100° C. Accordingly, if such carbon material heat-treated at 800° C. is used as the negative electrode, the total amount of charge cannot completely be consumed for discharging to leave some irreversible capacity. Actually, since there is used a carbon material heat-treated at 1,100° C. which can provide the maximum discharge capacity, the resulting cell is put into uses as incompletely charged. That is, in the conventional lithium secondary cell employing a hard carbon material as the negative electrode, discharging efficiency (discharge capacity divided by amount of charge) decreases if the charge capacity is increased, to give a reduced amount of discharge, inconveniently.

However, there is no established theory on the mechanism of electrode reaction how the hard carbon electrode is doped and undoped with lithium ions in the lithium secondary cell. Accordingly, under the present circumstances, the irreversible capacity caused by the difference between the charge capacity value and discharge capacity value has not been elucidated yet.

OBJECT AND SUMMARY OF THE INVENTION

In order to overcome the above problems and attain the intended object suitably, the present inventors made extensive studies with a view to examining behaviors of hard carbon to be used as the negative electrode of a lithium secondary cell, improving the charge capacity, as well as, minimizing the irreversible capacity by permitting the amount of charge to be discharged as much as possible, and obtaining a lithium secondary cell having excellent cell capacity. As a result, they found that when the amount of an organic solvent to be adsorbed onto the hard carbon serving as the negative electrode is reduced, the discharge efficiency does not decrease so much even if the charge capacity is increased.

More specifically, based on the studies on the relationship between physicochemical characteristics of the hard carbon and its charge and discharge capacities when it is used as the negative electrode, the present inventors found that the amount of the adsorbed organic solvent used as an electrolyte in the lithium secondary cell greatly influences the cell capacity, particularly discharge capacity. That is, they found that the greater is the amount of the organic solvent adsorbed onto the hard carbon, the lower becomes the discharge capacity.

Therefore, it is a first objective of the invention to provide a carbon negative electrode material for a lithium secondary cell, in which charge capacity and discharge capacity are improved and also the irreversible capacity is minimized.

It is a second objective of the invention to provide a lithium secondary cell having excellent cell capacity.

A first aspect of the invention relates to a carbon negative electrode material comprising microparticles of hard carbon, wherein pores in the carbon microparticles have an inlet diameter such that an organic solvent in the electrolyte of a lithium secondary cell is substantially impermeable and that lithium ions are permeable.

A second aspect of the invention relates to a carbon negative electrode material, wherein the inlet diameter of the pores is adjusted by pyrolytic deposition of a heat-decomposable hydrocarbon vapor.

A third aspect of the invention relates to a carbon negative electrode material, wherein the inlet diameter of the pores is adjusted by pyrolytic deposition of a liquid heat-decomposable hydrocarbon compound applied to a carbon base material.

A fourth aspect of the invention relates to a carbon negative electrode material, wherein the carbon microparticles have a nature such that they may adsorb 2% by weight or more of the organic solvent when the microparticles are pulverized to have a reduced average particle size of ½ or below the original average particle size.

A fifth aspect of the invention relates to a lithium secondary cell comprising a negative electrode containing as a major component hard carbon microparticles, wherein pores in the carbon microparticles have an inlet diameter such that the organic solvent in the electrolyte is substantially impermeable and lithium ions are permeable.

A sixth aspect of the invention relates to a lithium secondary cell, wherein the pore inlet diameter is adjusted by pyrolytic deposition of a heat-decomposable hydrocarbon vapor.

A seventh aspect of the invention relates to a lithium secondary cell, wherein the pore inlet diameter is adjusted by pyrolytic deposition of a liquid heat-decomposable hydrocarbon compound applied to the carbon base material.

An eighth aspect of the invention relates to a lithium secondary cell, wherein the carbon microparticles have a nature such that they may adsorb 2% by weight or more of the organic solvent when the microparticles are pulverized to have a reduced average particle size of ½ or below the original average particle size.

In order to allow the pores of the hard carbon microparticles to have an inlet diameter through which the organic solvent, in the electrolyte of the lithium secondary cell is substantially impermeable and that lithium ions are permeable, carbon is allowed to deposit at the pore inlets by means of pyrolysis of a gaseous or liquid heat-decomposable hydrocarbon as practiced in the process of producing a molecular sieving carbon.

Accordingly, by selecting optimum treatment conditions in the pyrolysis of a heat-decomposable hydrocarbon, the pores can be allowed to have an inlet diameter such that the organic solvent having a molecular size bigger than lithium ion cannot intrude into the pores and that lithium ions can freely pass in and out of the pores.

In this case, the hard carbon microparticles have a nature such that they may adsorb 2% by weight or more of the organic solvent when the microparticles are pulverized to have a reduced average particle size of ½ or below the original average particle size, and the pore volume remains substantially unchanged.

That is, by depositing carbon formed by pyrolysis to the pore inlets to reduce the pore inlet diameter, the amount of the organic solvent to be adsorbed can be made substantially nil without changing the pore volume in which lithium ions are doped.

The pore inlet diameter, which may depend on the kind of organic solvent employed as the electrolyte, is substantially 0.15 nm to 0.5 nm.

As described above, the carbon negative electrode material according to the present invention, in which lithium ions are designed to be intrudable into the pores of hard carbon but not the organic solvent, has improved discharging efficiency, so that the higher the amount of charge, the higher the amount of discharge.

Accordingly, the discharge capacity can be approximated to the charge capacity, improving noticeably the cell capacity of the lithium secondary cell.

BRIEF DESCRIPTION OF THE DRAWINGS

The features of this invention that are believed to be novel are set forth with particularity in the appended claims. The invention, together with the objects and advantages thereof, may best be understood by reference to the following description of the preferred embodiments taken in conjunction with the accompanying drawings in which:

DETAILED DESCRIPTION OF PREFERRED EMBODIMENTS

Figure 1:
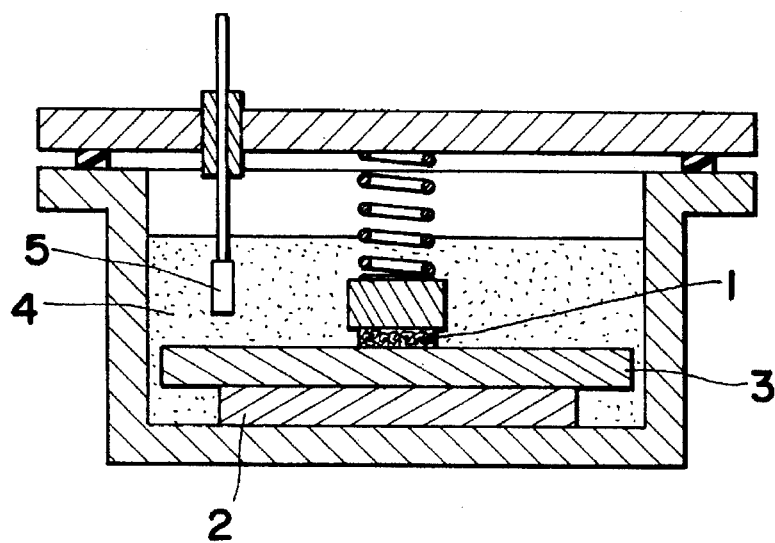
FIG. 1 is a cross-sectional view of a testing cell.

The present invention will be described below by way of Examples and Comparative Examples.

EXAMPLE 1

A phenolic resin (PGA-4560, manufactured by Gun-el Chemical Industry Co., Ltd.), which was used as a raw material of hard carbon serving as a negative electrode, was subjected to dry distillation at 550° C. and then heat-treated at 800° C. in a nitrogen stream for one hour to obtain a hard carbon. Subsequently, the thus obtained hard carbon was pulverized over an oscillating ball mill employing alumina balls for 10 minutes. Average particle size of the thus treated hard carbon microparticles was determined using an analyzer of particle size distributions by laser light scattering (Model 7995-10PC SPA, manufactured by Leeds & Northrup Instrument), and the result was 6.2 μm.

Next, as the treatment for adjusting the pore inlet diameter, the hard carbon microparticles were heated to 700° C. while a nitrogen gas saturated with toluene at 25° C. was allowed to flow at a rate of 3 lit/min for one hour to deposit carbon formed by pyrolysis of the toluene on the surfaces of the microparticles.

In order to confirm that the hard carbon microparticles after the post-treatment have a nature such that they may adsorb 2% by weight or more of an organic solvent when the microparticles are pulverized to have a reduced average particle size of ½ or below the original average particle size, the microparticles were repulverized to measure the pore volume and amounts of adsorbed propylene carbonate (PC) and dimethoxyethane (DME) used as battery solvents, before and after the repulverization treatment, respectively. The results are as shown in Table 1. Incidentally, the repulverization was carried out for 2 hours and 20 hours.

TABLE 1

|  | \multicolumn{3}{c}{Repulverization time [hour]} | | |
| --- | --- | --- | --- |
|  | 0 | 2 | 20 |
| Average grain size [μm] | 6.2 | 3.1 | 1.6 |
| Pore volume [cm³/g] | 0.145 | 0.147 | 0.151 |
| Amount of PC adsorbed [wt %] | 0.0 | 2.5 | 8.3 |
| Amount of DME adsorbed [wt %] | 0.0 | 8.1 | 24.9 |

As shown in Table 1, when the hard carbon microparticles, subjected to the post-treatment of adjusting the pore inlet diameter on the surfaces of microparticles having a particle size of 6.2 μm, were repulverized, the average microparticle size was halved to 3.1 μm in a repulverization time of 2 hours, and reduced to 1.6 μm in 20 hours. Although the pore volume remained substantially unchanged in each case, it can be understood that the amounts of PC and DME increased. That is, it can be appreciated that while PC and DME could not intrude into the pores since the pore inlets were reduced before repulverization, but that greater size inlets were formed afresh by the repulverization which permits intrusion of PC and DME.

Next, to the hard carbon microparticles subjected to the post-treatment of adjusting pore inlet diameter was added 10% by weight of polyvinylidene fluoride as a binder. The resulting mixture was then subjected to press molding to provide a coin-shaped test electrode having a diameter of 10 mm and a thickness of 0.5 mm.

The test electrode was set in a testing cell (evaluation cell) so as to evaluate its performance as the negative electrode material by carrying out charge/discharge capacity test.

This testing cell has a structure as shown in FIG. 1. The reference number 1 shows a test electrode; 2 a lithium electrode employed as a counter electrode; 3 a separator interposed between the electrodes; 4 an electrolyte; and 5 a reference lithium electrode.

As the electrolyte there was used a mixture of propylene carbonate/dimethoxyethane=1:1 to which lithium perchlorate ($LiClO_4$) had been added as a supporting electrolyte in an amount of 1.0 mol/lit.

Figure 2:
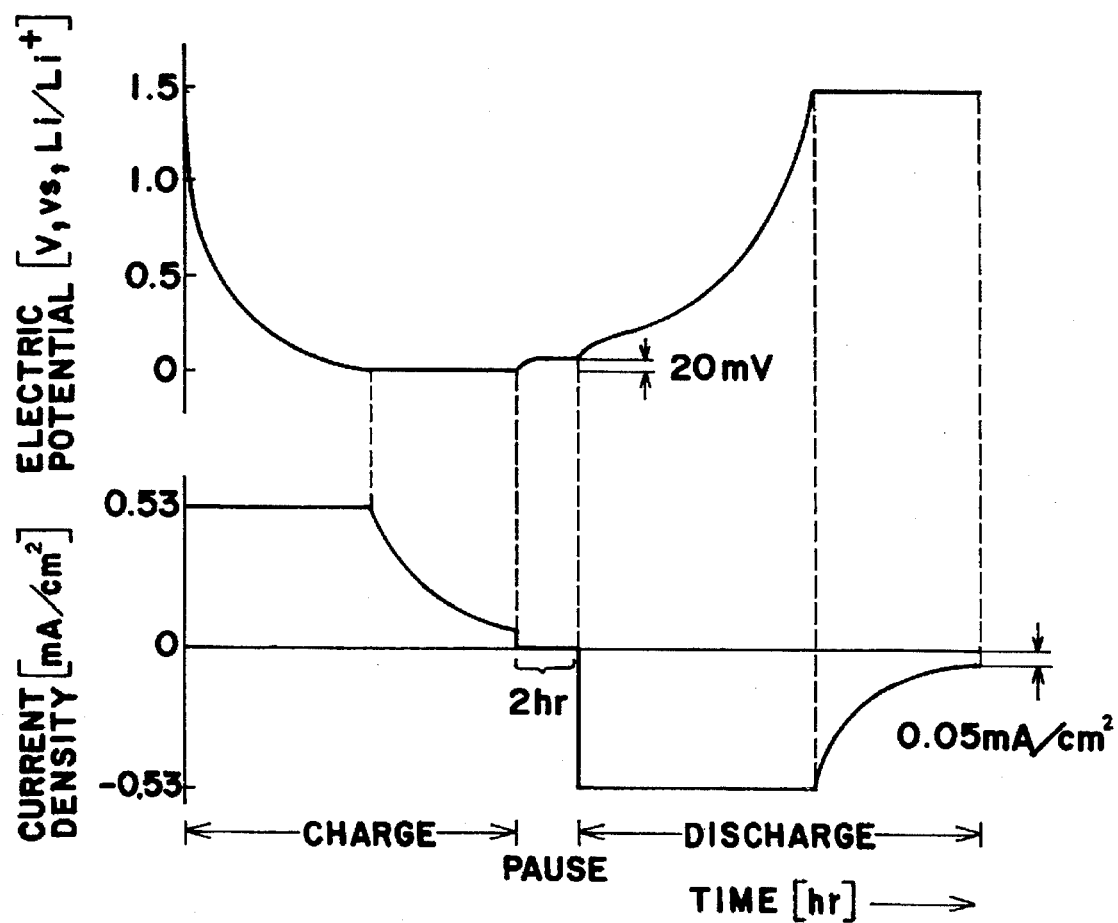
FIG. 2 is a chart showing change in the current density and electric potential in a charging and discharging test according to Example 1.

FIG. 2 is a chart showing changes in the current density and electric potential when charge/discharge test was carried out using the testing cell. Strictly speaking, in this testing cell, the test electrode (carbon electrode) serves as a positive electrode, so that doping of the carbon electrode with lithium means discharging. However, this process is referred here to as charging for convenience's sake so as to be consistent with actual cells; whereas the process of undoping the carbon electrode with lithium is referred here to as discharging.

As shown in FIG. 2, the testing cell was first charged. The initial potential of the carbon electrode serving as the negative electrode before energization was about 1.5 V relative to the reference lithium electrode. The electrode potential was gradually lowered when energization of the cell was started under a constant current at a current density of 0.53 mA/cm². When the electrode potential reached to 0 mV, the constant current was switched to a controlled potential. The power supply was cut off when the current density dropped to a very low level, and charging was terminated when the potential recovered to about 20 mV or below after 2 hours of pause.

After the 2-hour pause, discharging was carried out. The discharging was started at a constant current of 0.53 mA/cm². When the potential reached to 1.5 V, the constant current was switched to a controlled potential, and discharging was terminated when the current density dropped to 0.05 mA/cm² or below. Measurement results including charge and discharge capacities, etc. are shown in Table 2. It should be noted here that the charge and discharge capacities each mean the volume per g carbon, and the same shall apply in the following Examples.

TABLE 2

|  | Example 1 | Example 2 | Example 3 |
| --- | --- | --- | --- |
| Amount of PC adsorbed [wt %] | 0.0 | 0.0 | 0.1 |
| Amount of DME adsorbed [wt %] | 0.0 | 0.0 | 0.9 |
| Charge capacity [mAh/g] | 711 | 644 | 522 |
| Discharge capacity [mAh/g] | 527 | 465 | 333 |
| Discharge efficiency [%] | 74.1 | 72.2 | 63.8 |

EXAMPLE 2

A furan resin (VF-307, manufactured by Hitachi Chemical Co., Ltd.), which was used as a raw material, was subjected to dry distillation at 600° C. and then heat-treated at 800° C. in a nitrogen stream for one hour to obtain a hard carbon. Subsequently, the thus obtained hard carbon was pulverized in the same manner as in Example 1 to adjust the pore inlet diameter and provide a carbon electrode, which was subjected to charging and discharging test. Measurement results including amounts of adsorbed PC and DME, charge and discharge capacities, etc. are as shown in Table 2.

EXAMPLE 3

A coconut shell char, which was used as a raw material, was washed with dilute hydrochloric acid, subjected to dealkalization treatment, washed with water, dried and then heat-treated at 800° C. in a nitrogen stream for one hour to obtain a hard carbon. Subsequently, the thus obtained hard carbon Was pulverized in the same manner as in Example 1 to adjust the pore inlet diameter and provide a carbon electrode, which was subjected to charging and discharging test. Measurement results including amounts of adsorbed PC and DME, charge and discharge capacities, etc. are as shown in Table 2.

COMPARATIVE EXAMPLES 1 TO 3

The procedures of Examples 1 to 3 were repeated analogously, except that the pore inlet diameter was not adjusted in Comparative Examples 1 to 3, to provide carbon electrodes, which were subjected to charging and discharging test, respectively. Measurement results including amounts of adsorbed PC and DME, charge and discharge capacities, etc. are as shown in Table 3.

TABLE 3

|  | Comparative Example 1 | Comparative Example 2 | Comparative Example 3 |
| --- | --- | --- | --- |
| Amount of PC adsorbed [wt %] | 10.4 | 11.2 | 13.4 |
| Amount of DME | 25.9 | 29.4 | 24.7 |

TABLE 3-continued

|  | Comparative Example 1 | Comparative Example 2 | Comparative Example 3 |
|---|---|---|---|
| adsorbed [wt %] |  |  |  |
| Charge capacity [mAh/g] | 675 | 619 | 505 |
| Discharge capacity [mAh/g] | 358 | 327 | 220 |
| Discharge efficiency [%] | 53.0 | 52.8 | 43.6 |

As can be seen from the results shown in Tables 2 and 3, by subjecting the carbon raw material to pore inlet diameter adjusting treatment to reduce the pore inlet diameter so that the organic solvent in the electrolyte may be impermeable and lithium ions may be permeable, i.e. charging and discharging are feasible by the passage of lithium ions but the organic solvent which is a causative of discharge capacity drop is prevented from intruding into the pores, and that the amount of organic solvent to be adsorbed onto the hard carbon serving as the negative electrode may be substantially be nil, the discharge capacity can be improved to minimize the irreversible capacity.

EXAMPLE 4

A phenolic resin (the same resin as used in Example 1) was subjected to dry distillation at 550° C. and then heat-treated at 900° C. in a nitrogen stream for one hour, followed by pulverization to obtain hard carbon microparticles. Subsequently, the thus obtained hard carbon microparticles were subjected to the same carbon deposition treatment as in Example 1 so as to adjust the pore inlet diameter on the carbon microparticle surfaces using toluene, benzene and butane as the heat-decomposable hydrocarbon vapors, respectively. Subsequently, performance test was carried out using the testing cell as used in Example 1, and the results are as shown in Table 4.

TABLE 4

|  | Toluene | Benzene | Butane |
|---|---|---|---|
| Amount of PC adsorbed [wt %] | 0.0 | 0.0 | 0.0 |
| Amount of DME adsorbed [wt %] | 0.0 | 0.4 | 0.8 |
| Charge capacity [mAh/g] | 641 | 632 | 591 |
| Discharge capacity [mAh/g] | 474 | 462 | 407 |
| Discharge efficiency [%] | 74.1 | 73.1 | 68.9 |

EXAMPLE 5

The pore inlet diameter of the hard carbon microparticles obtained in the same manner as in Example 4 was adjusted using 2,4-xylenol, quinoline and creosote as the liquid heat-decomposable hydrocarbons, respectively. More specifically, the hydrocarbons were applied on the surfaces of the hard carbon microparticles, and the thus treated microparticles were heat-treated at 900° C. for one hour. The amount of each hydrocarbon used for the carbon deposition treatment was 10, 5 and 15% by weight, respectively.

Next, performance test was carried out using the testing cell shown in FIG. 1 in the same manner as in Example 1, and the results are as shown in Table 5.

TABLE 5

|  | Xylenol | Quinoline | Creosote |
|---|---|---|---|
| Amount of PC adsorbed [wt %] | 0.0 | 0.0 | 0.0 |
| Amount of DME adsorbed [wt %] | 0.84 | 0.91 | 1.01 |
| Charge capacity [mAh/g] | 590 | 544 | 512 |
| Discharge capacity [mAh/g] | 396 | 337 | 292 |
| Discharge efficiency [%] | 67.1 | 61.9 | 57.0 |

COMPARATIVE EXAMPLE 4

Hard carbon microparticles were obtained in the same manner as in Example 4. A carbon electrode was prepared in the same manner as in Example 1, except that the post-treatment of adjusting the pore inlet diameter on the surface of the hard carbon microparticles was omitted. Measurement results including the amounts of PC and DME adsorbed, charging and discharging capacities, etc. are as shown in Table 6.

TABLE 6

|  | Toluene |
|---|---|
| Amount of PC adsorbed [wt %] | 5.19 |
| Amount of DME adsorbed [wt %] | 14.83 |
| Charge capacity [mAh/g] | 502 |
| Discharge capacity [mAh/g] | 271 |
| Discharge efficiency [%] | 54.0 |

While the treatment of adjusting the pore inlet diameter was carried out using toluene, benzene and butane as heat-decomposable hydrocarbon vapors in Example 4, and xylenol, quinoline and creosote as liquid heat-decomposable hydrocarbons in Example 5, the amounts of PC and DME deposited are substantially nil with increased amount of charge and notably increased amount of discharge in these Examples compared with Comparative Example 4.

EXAMPLE 6

Figure 3:
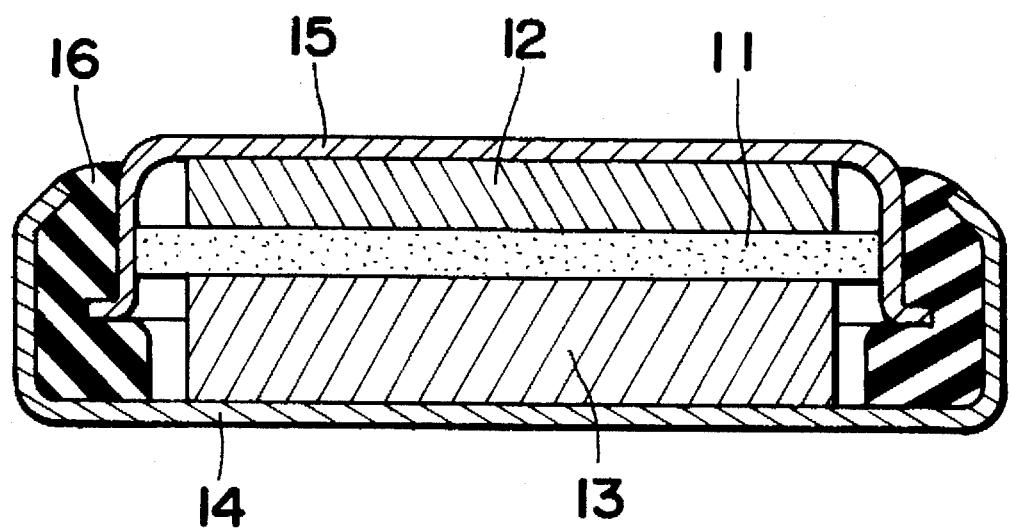
FIG. 3 shows in cross-sectional view one embodiment of lithium secondary cell.

Next, a coin-shaped lithium secondary cell was fabricated, as shown in FIG. 3, to carry out performance test. This coin-shaped lithium secondary cell consists of a separator 11 impregnated with a lithium ion-containing organic solvent as an electrolyte, a positive electrode 12 containing LiCoO$_2$ as a major component and a negative electrode 13 containing a hard carbon as a major component which are disposed on each side of the separator 11 to oppose to each other via the separator 13, with these elements 11,12,13 being enclosed by a can 14, a cap 15 and a gasket 16 for fixing the can 14 and the cap 15 together such that they may be electrically insulated from each other.

The carbon electrode prepared in Example 1 was used as the negative electrode 13. The positive electrode 12 was prepared by adding 1 g of graphite and 1 g of polytetrafluoroethylene to 10 g of lithium cobaltate, mixing well the resulting mixture and subjecting 2 g of the mixture to press molding to provide a disc having a diameter of 10 mm. A polypropylene porous film was used as the separator 11. As the electrolyte, there was used a mixture of PC/DME=1:1 to which 1.0 mol/lit of LiClO$_4$ had been added as a supporting electrolyte.

After the thus fabricated lithium secondary cell was charged under a constant current at a current density of 0.53 mA/cm$^2$ until the voltage reached 3.5 V, discharging was carried out at the same current density to the discharge end point voltage of 1.0 V. The above procedures were repeated to measure change in the charge and discharge capacities. The results are as shown in Table 7.

TABLE 7

|  | Charge/discharge cycle numbers [runs] | | | |
| --- | --- | --- | --- | --- |
|  | 1 | 2 | 5 | 10 |
| Charge capacity [mAh/g] | 627 | 510 | 483 | 480 |
| Discharge capacity [mAh/g] | 460 | 468 | 469 | 469 |
| Discharge efficiency [%] | 73 | 92 | 97 | 98 |

It should be noted here that the shape of the lithium secondary cell itself, e.g. the shape and size of the can 14 or cap 15, the material used as the positive electrode 12, the kind of organic solvent constituting the electrolyte, etc. are not critical but can arbitrarily be selected depending on various conditions including the state where the cell is used, cell capacity, etc.

COMPARATIVE EXAMPLE 5

A coin-shaped lithium secondary cell was fabricated in the same manner as in Example 6 using the carbon electrode prepared in Comparative Example 1 as the negative electrode to measure changes in the charge and discharge capacities by repeating a cycle of charging and discharging. The results are as shown in Table 8.

TABLE 8

|  | Charge/discharge cycle numbers [runs] | | | |
| --- | --- | --- | --- | --- |
|  | 1 | 2 | 5 | 10 |
| Charge capacity [mAh/g] | 586 | 382 | 201 | 113 |
| Discharge capacity [mAh/g] | 260 | 241 | 160 | 101 |
| Discharge efficiency [%] | 44 | 63 | 80 | 89 |

The cell fabricated in Example 6, which uses a carbon negative electrode subjected to the treatment of adjusting pore inlet diameter, has great charge and discharge capacitates also excellent repeated charge/discharge characteristics compared with that obtained in Comparative Example 5.

It should be apparent to those skilled in the art that the present invention may be embodied in many other specific forms without departing from the spirit or scope of the invention. Therefore, the present embodiments are to be considered as illustrative and not restrictive, and the invention is not to be limited to the details given herein, but may be modified within the scope of appended claims.

What is claimed is:

1. A carbon negative electrode material comprising non-graphitizing carbon microparticles having pores in which organic solvent in electrolytic solution and lithium ions can be adsorbed, which microparticles having heat-decomposed carbon deposited on their surfaces, so that said microparticles can be doped and undoped with the lithium ions in the electrolytic solution and said organic solvent in the electrolytic solution cannot be apparently adsorbed.

2. The carbon negative electrode material according to claim 1, wherein said microparticles adsorb said organic solvent by being pulverized.

3. The carbon negative electrode material according to claim 2, wherein said microparticles adsorb said organic solvent in an amount of 25–24.9 by weight when said microparticles are pulverized to have a reduced average particle size of ½ or below the original average particle size.

4. The carbon negative electrode material according to claim 1, wherein said pores have an inlet diameter of 0.15 to 0.5 nm.

5. The carbon negative electrode material according to claim 1, wherein said microparticles are press molded after being admixed with a binder and a solvent.

6. The carbon negative electrode material according to claim 1, wherein said heat-decomposed carbon deposited on the surfaces of said microparticles is deposited by heat-decomposition of a heat-decomposable hydrocarbon.

7. The carbon negative electrode material according to claim 6, wherein said heat-decomposable hydrocarbon is selected from the group consisting of toluene, benzene, butane, 2,4-xylenol, quinoline and creosote.

8. The carbon negative electrode material according to claim 1, wherein said organic solvent is 1:1 mixture of propylene carbonate and dimethoxyethane and the electrolyte is lithium perchlorate.

9. A lithium secondary cell comprising a positive electrode, a negative electrode and an electrolytic solution, wherein said negative electrode comprises non-graphitizing carbon microparticles having pores in which organic solvent in electrolytic solution and lithium ions can be adsorbed, which microparticles have heat-decomposed carbon deposited on their surfaces, so that said microparticles can be doped and undoped with the lithium ions in the electrolytic solution and said organic solvent in the electrolytic solution cannot be apparently adsorbed.

10. The lithium secondary cell according to claim 9, wherein said microparticles adsorb said organic solvent by being pulverized.

11. The lithium secondary cell according to claim 10, wherein said microparticles adsorb said organic solvent in an amount of 2.5–24.9% by weight when said microparticles are pulverized to have a reduced average particle size of ½ or below the original average particle size.

12. The lithium secondary cell according to claim 9, wherein said pores have an inlet diameter of 0.15 to 0.5 nm.

13. The lithium secondary cell according to claim 9, wherein said microparticle are press molded after being admixed with a binder and a solvent.

14. The lithium secondary cell according to claim 9, wherein said heat-decomposed carbon deposited on the surfaces of said microparticle is deposited by heat-decomposition of a heat-decomposable hydrocarbon.

15. The lithium secondary cell according to claim 14, wherein said heat-decomposable hydrocarbon is selected from the group consisting of toluene, benzene, butane, 2-4-xylenol, quinoline and creosote.

16. The lithium secondary cell according to claim 6, wherein said organic solvent is 1:1 mixture of propylene carbonate and dimethoxyethane and the electrolyte is lithium perchlorate.

* * * * *